US006879679B1

(12) United States Patent
Ong

(10) Patent No.: US 6,879,679 B1
(45) Date of Patent: Apr. 12, 2005

(54) ANALYSIS METHOD FOR PROVISIONING SUBSCRIBERS IN A NEXT GENERATION TELECOMMUNICATIONS NETWORK

(75) Inventor: Piu Piu Ong, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 501 days.

(21) Appl. No.: 09/863,728

(22) Filed: May 22, 2001

(51) Int. Cl.[7] .................. H04M 7/00; H04M 3/42; H04M 11/10

(52) U.S. Cl. ................... 379/219; 379/201.03; 455/414

(58) Field of Search ...................... 455/414; 379/201.03

(56) References Cited

U.S. PATENT DOCUMENTS

| 6,415,150 B1 | | 7/2002 | Owens et al. |
| 6,584,186 B1 | * | 6/2003 | Aravamudan et al. . 379/201.03 |
| 6,622,016 B1 | * | 9/2003 | Sladek et al. ................ 455/414 |
| 6,765,918 B1 | | 7/2004 | Dixon et al. |
| 6,788,942 B2 | | 9/2004 | Owens et al. |

OTHER PUBLICATIONS

"Snapshot Eftia", Eftia OSS Solutions Inc.: Software Solutions for Next–Generation Service Providers, http://www.eftia.com/new/faq.html, downloaded Sep. 12, 2001.
"Telcordia Next Generation Network Solution Description", Telcordia–Telcordia Next Generation Networks, http://www.telcordia.com/solutions/ngn/description.html, downloaded Sep. 12, 2001.
"Telcordia Next Generation Network Solution Products and Services Features," http://www.telcordia.com/solutions/ngn/features.html, downloaded Sep. 12 2001.

"Eftia and Syndesis Partner to Provide Top–to–Bottom Service Activation for Next–Generation Communications Providers Alliance deliver open, interoperable and scalable OSS products that speed time to market and deliver competitive advantage," http://www.eftia.com/new/2000/nr2000919.html, Sep. 19, 2000, downloaded Sep. 12, 2001.
Williams Reborn, "Architecting a Next–Generation Network: No TDM," Telecommunications Online, Feb. 1999, http://www.telcoms–mag.com/issues/199902/tcs/arch.html, downloaded Sep. 12, 2001.
"Enavis Networks Announces Next Generation, T::Dax Enavis Networks' T::DAX offers new superband capabilities," http://www.ecitele.com/tdax superband supercomm bw.htm, downloaded Sep. 12, 2001.

(Continued)

*Primary Examiner*—Ahmad F. Matar
*Assistant Examiner*—Thjuan Knowlin
(74) *Attorney, Agent, or Firm*—Hickman Palermo Truong & Becker LLP

(57) ABSTRACT

A method to systematically analyze a next generation telecommunications network to result in creating a provisioning plan for provisioning the network to provide services for one or more subscribers. In one specific embodiment, the method involves creating and storing information that represents a logical decomposition of the next generation network into a plurality of discrete functional areas. The information representing the functional areas is analyzed to identify one or more provisioning requirements for each of the functional areas. One or more provisioning procedures are determined, and one or more required provisioning tools are identified for each of the functional areas, based on the provisioning requirements. A sequence of execution of the procedures and tools is created and stored. Following the procedures and using the tools in the prescribed sequence results in a plan for provisioning the network for the services to which the subscriber has subscribed.

60 Claims, 7 Drawing Sheets

OTHER PUBLICATIONS

"Compaq Services Introduces Next Generation Network Integration Services for Communications Industry, Phase two of next generation network initiative helps network service providers enhance their network operations for the Internet age," Jun. 21, 1999, http://www.compaq.com/services/pr news/press archive/pr 062199.html, downloaded Sep. 12, 2001.

"Research Products: IP Local Loop: Accessing the Next Generation Network," http://www.analysys.com/articles/StandardArticle, downloaded Sep. 12, 2001.

"Bell Atlantic launches next–generation long distance data network to address $80 billion market for $21^{st}$ century communications," Jun. 8, 1998, http://www.lucent.com/press/0698/980608, downloaded Sep. 12, 2001.

* cited by examiner

Plain Old Telephone System 100

US 6,879,679 B1

ANALYSIS METHOD FOR PROVISIONING SUBSCRIBERS IN A NEXT GENERATION TELECOMMUNICATIONS NETWORK

FIELD OF INVENTION

The present invention generally relates to provisioning subscribers in a telecommunication network. The invention relates more specifically to an analysis method to define procedures to provision subscribers in a next generation telecommunications network.

BACKGROUND OF THE INVENTION

The structure and function of telecommunications networks presently are undergoing remarkable change. The traditional circuit-switched telephone networks, also known as the public switched telephone network (PSTN) or Plain Old Telephone System (POTS), are undergoing replacement by heterogeneous networks that use numerous different digital communication protocols, hardware and other technologies. These new heterogeneous networks may use packet switching, Internet Protocol (IP), asynchronous transfer mode (ATM) switching, coaxial cable transmission, wireless links, and many other kinds of connections, equipment and interfaces. The new networks can carry data representing digital files, voice, video, and other media, and can provide multicasting and numerous other advanced services. Such networks are referred to herein as Next Generation Networks (NGN).

Both the POTS networks and NGNs use digital electronic equipment, computers and software for command, communication and control. One key difference between the architecture of the hardware and software in the POTS networks and NGNs is where intelligence is located in the network to deliver services and what kind of intelligence is provided. In a POTS network, processors that provide intelligence are centrally located, as in dedicated telephone company central offices. In contrast, in an NGN, intelligence is distributed across different devices in the network. Routers, switches, gateways, and related management software may be located in numerous locations, and network software providing command, control and communication may be located in any such device.

FIG. 1 is a block diagram of an example of a POTS network 100. In this example configuration, a centralized architecture has intelligence that is provided by one or more Class 5 (C5) switches 102A, 102B, a Service Control Point (SCP) 104, a Remote Digital Terminal (RDT) 106, and other nodes. Connections between a C5 switch 102A, 102B or RDT 106 and one or more subscriber telephones 112A are accomplished using copper wire. Each C5 switch is, for example, a No. 5 Electronic Switching System (5ESS) of the type first introduced by AT&T Bell Laboratories.

FIG. 2 is a block diagram of an example of an NGN 200. NGN architecture is quite different from POTS architecture. In particular, intelligence is distributed to many devices in the network, which may be geographically separated by large distances. In the example arrangement shown in FIG. 2, C5 switch 102A is coupled by copper wire connection 110 to a gateway 202, which is communicatively coupled to an Internet Protocol (IP) network 204.

A SCP 104 may also communicate with IP network 204 through PSTN 108 and a soft switch 206, which is communicatively coupled relatively directly to the IP network. The soft switch and the CPE connected over an IP network provide the functions of a POTS C5 switch. The gateway 202 and the CPE 212A provide the functions of a POTS RDT. In both cases, multiple devices distributed across the network participate in the processing and delivery of services.

Various other kinds of equipment and connections may be found in the NGN network 200. For example, IP network 204 may be connected through Digital Subscriber Line (DSL) device 210 to a Customer Premises Equipment (CPE) device 212A that services one or more workstations 216 or telephones 214. Workstations 216 may be personal computers, computer workstations, terminals, or other end station devices. Further, there may be a T1 connection 218 to a router 220 that services IP phones 214 or other workstations 216. As still another example, a cable gateway 224 may couple the IP network 204 to a cable system head-end facility 226. Signals from IP network 204 may also reach subscribers through the cable system by a communicative connection of cable gateway 224 to CPE 212B, which services one or more telephones 214, televisions 230, or other devices. Thus, in the example network of FIG. 2, CPE devices may access the NON through cable, T1 and Digital Subscriber Line (DSL) links.

Each Customer Premises Equipment (CPE) device 212A, 212B is an intelligent device installed at the customer premises such as a residence, business facility, etc. Each CPE collaborates with other devices in the network 200 to deliver multiple services such as voice, video, and data connections to the Internet.

When an individual requests access to the POTS network for the first time, the owner or operator of the POTS network or other service provider is required to carry out numerous tasks. These tasks may be triggered by an individual moving to a new home, a business requesting an additional line to its premises, etc. Tasks for provisioning a new telephone subscriber may include a credit check, allocation of telephone number, updating 411 and 911 directories, creating subscriber information such as billing address, preferred long distance carrier, etc. These "back office" tasks are beyond the scope of this document, which focuses on the task to provision a subscriber on the network to activate voice service.

As part of deployment and maintenance of a POTS network, records are kept about copper loops owned by a service provider. In this context, the term "copper loop" refers to the infrastructure owned and maintained by an Incumbent Local Exchange Carrier ("ILEC," formerly known as the Regional Bell Operating Companies (RBOCs)), i.e., copper wires from CO or RDT to a termination point (residence, office, etc.). For example, when a subscriber calls his provider to order new service, the provider has information such as whether the house is wired for telephone service, and if it is, how many wall outlets, etc. Another example is if a service provider has information on which level of DSL services can be provided to a neighborhood, the service provider also knows how far the house is from the CO, quality of the "copper wires", etc., hence, what speed can be guaranteed to a potential DSL customer. Such information is used by service providers to process service and may be stored in one or more databases. When a customer places an order for service with the service provider, these records are used to determine if the service provider is physically able to provide service to the requested location. If service can be provided, the "back office" tasks are carried out. Thereafter, the service provider carries out network provisioning for the subscriber. Network provisioning operations may include provisioning the subscriber on the C5 switch and RDT, depending on how the copper loop is terminated in the Central Office (CO). Some network services may require provisioning the SCP through its Service Management System (SMS).

Provisioning subscribers in an NGN is significantly more complicated. As noted above, many different access methods can be used to connect CPE to the core network. Therefore, the network operator must verify that it has properly provisioned and installed physical network access points, such as DSL concentrators and cable gateways, that can serve subscribers before the subscribers are provisioned.

Provisioning NGN subscribers involves more than just provisioning the Soft Switch and the Gateway. If a subscriber is served by a Gateway, then the C5 switch that is associated with that Gateway also must be provisioned. Provisioning procedures also include provisioning subscribers on other network devices. Devices that have a role in the delivery of services to subscribers are touched when activating a service. These devices may be in the core network, at the access edge, and/or customer premises. As in a POTS network, some service orders may require provisioning SCP services through the SMS.

The requirements and procedures to provision a POTS subscriber are well defined and understood. This can be attributed to decades of experience in the management of POTS network. The nature of an architecture that is based on centralized management and processing of network services limits the requirements around a limited number of devices that need to be touched when provisioning a subscriber.

The distribution of intelligence to deliver service across network devices in an NGN that consists of CPE, access and core networks using different technologies has introduced new provisioning requirements, and the need for new procedures to fulfill these requirements.

Based on the foregoing, there is a need for a way to identify provisioning requirements for such a network and define procedures to activate services for subscribers on the network. As shown in the above NGN, the possible permutation of CPE, access and core network technologies is not a small number. Offering multi-service packages, such as data and voice, further increases the level of complexity of this environment. Hence, the job to identify provisioning requirements is non-trivial.

The nature of distributed Next Generation Network architecture that consists of different technologies supporting different types of network access methods and multi-service offerings have introduced new challenges to the task of provisioning subscribers. Based on the foregoing, there is a clear need for an analysis method that provides a systematic approach to define the procedures required for provisioning NGN subscribers.

SUMMARY OF THE INVENTION

The foregoing needs, and other needs and objects that will become apparent for the following description, are achieved in the present invention, which comprises, in one aspect, a method for analyzing a next generation telecommunications network to result in creating a provisioning plan for provisioning the network to provide services for one or more subscribers. In one specific embodiment, the method involves creating and storing information that represents a logical decomposition of the next generation network into a plurality of discrete functional areas. The information representing the functional areas is analyzed to identify one or more provisioning requirements for each of the functional areas. One or more provisioning procedures are determined, and one or more required provisioning tools are identified for each of the fictional areas, based on the provisioning requirements. A sequence of execution of the procedures and tools is created and stored. Following the procedures and using the tools in the prescribed sequence results in provisioning the network for the services to which the subscriber has subscribed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

According to one aspect, an analysis method for provisioning subscribers in a Next Generation Network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein in sections according to the following outline:

1.0 DEFINITIONS 2.0 ANALYSIS METHOD 2.1 DECOMPOSE NETWORK AND PARTITION INTO MAJOR AREAS 2.2 ANALYZE MAJOR AREAS AND IDENTIFY PROVISIONING REQUIREMENTS 2.3 DEFINE PROCEDURE AND IDENTIFY TOOLS 2.4 DEFINE SEQUENCE OF EXECUTION OF PROCEDURES AND TOOLS 3.0 EXTENSIONS AND ALTERNATIVES

1.0 Definitions

Numerous acronyms and abbreviated terms are used in this document for brevity and convenience. The following definitions apply to such acronyms and terms. Such definitions are provided to enhance an understanding of the example embodiments that are illustrated herein. However, the invention is not limited to the definitions set forth herein and is not limited to using the defined terms, acronyms or abbreviations.

| ABBREVIATED TERM | DEFINITION |
|---|---|
| C5 | Class 5 |
| CO | Central Office |
| CP | Customer Premise Equipment |
| DHCP | Dynamic Host Control Protocol |
| DNS | Domain Name Server |
| DSL | Digital Subscriber Line |
| EMS | Element Management System |
| FQDN | Fully Qualified Domain Name |
| GUI | Graphical User Interface |
| IP | Internet Protocol |
| NMS | Network Management System |
| NGN | Next Generation Network |
| POTS | Plain Old Telephone System |
| PPP | Point-to-Point Protocol |
| PSTN | Public Switched Telephone Network |
| PVC | Permanent Virtual Circuit |
| RDT | Remote Digital Terminal |
| SCP | Service Control Point |

2.0 Analysis Method

In one embodiment, an approach to manage the task of identifying requirements and defining procedures for the diverse network configurations found in next generation networks involves systematically decomposing an NGN and partitioning it into areas. Each area comprises a device or group of devices that provide similar or related functions in the network. Services to be delivered over these devices identify the roles of these devices in the different areas. Proper device settings, or provisioning requirements are identified, and used to drive the definition of procedures for each area. The sequence of execution of these procedures is determined by their interdependencies. The set of all procedures for these areas makes up the end-to-end procedure to provision NGN subscribers.

Figure 3:
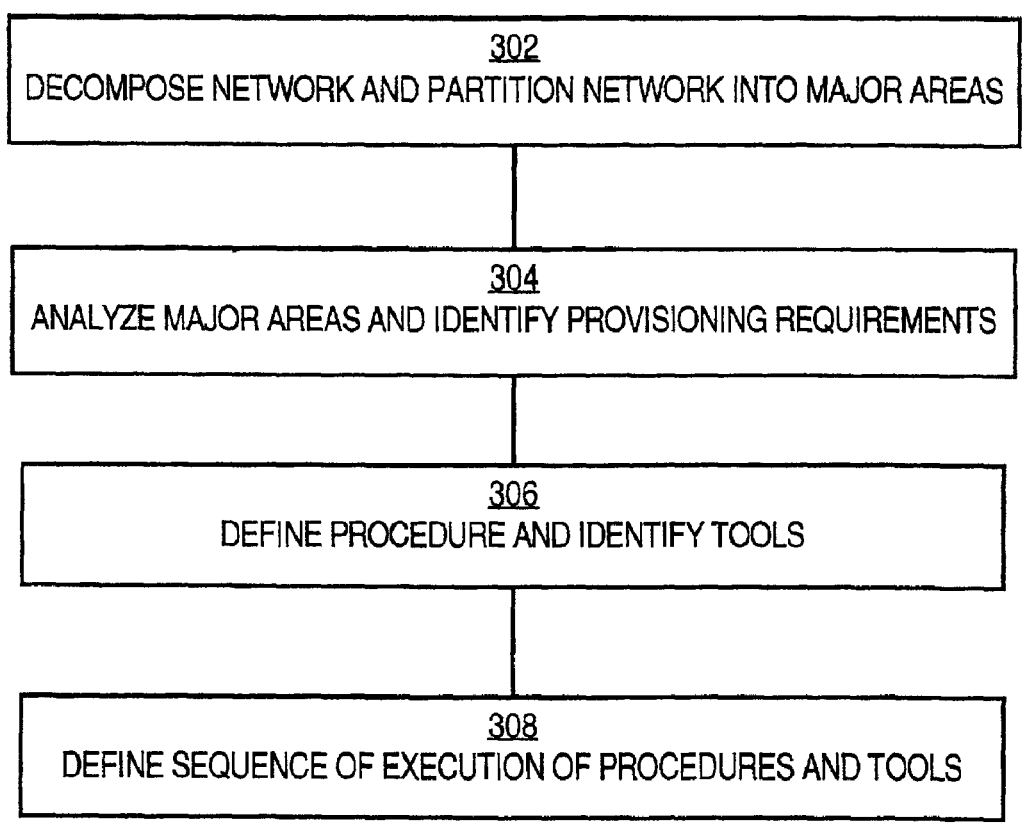
FIG. 3 is a flow diagram that illustrates one specific embodiment of an analysis method for provisioning subscribers in a next generation network.

FIG. 3 is a flow diagram that illustrates one specific embodiment of an analysis method for provisioning subscribers in a next generation network In block 302, the network is decomposed and partitioned into three major areas: Subscriber CPE, Access & Core Network, and Switch & Other Processors.

In block 304, each area is analyzed to identify provisioning requirements for the different services.

In block 306, based on provisioning requirements of each area, a provisioning procedure is defined, and tools are identified, if applicable.

Block 308 comprises determining a sequence of execution of steps in the procedure for each of the three areas to provision a subscriber.

The application of this analysis method is not limited to NGN for voice and data services. It can be applied to networks that provide other services such as video and home appliance control.

Steps of the foregoing method are now individually described in further detail.

2.1 Decompose Network and Partition Network into Three Major Areas

Figure 4A:
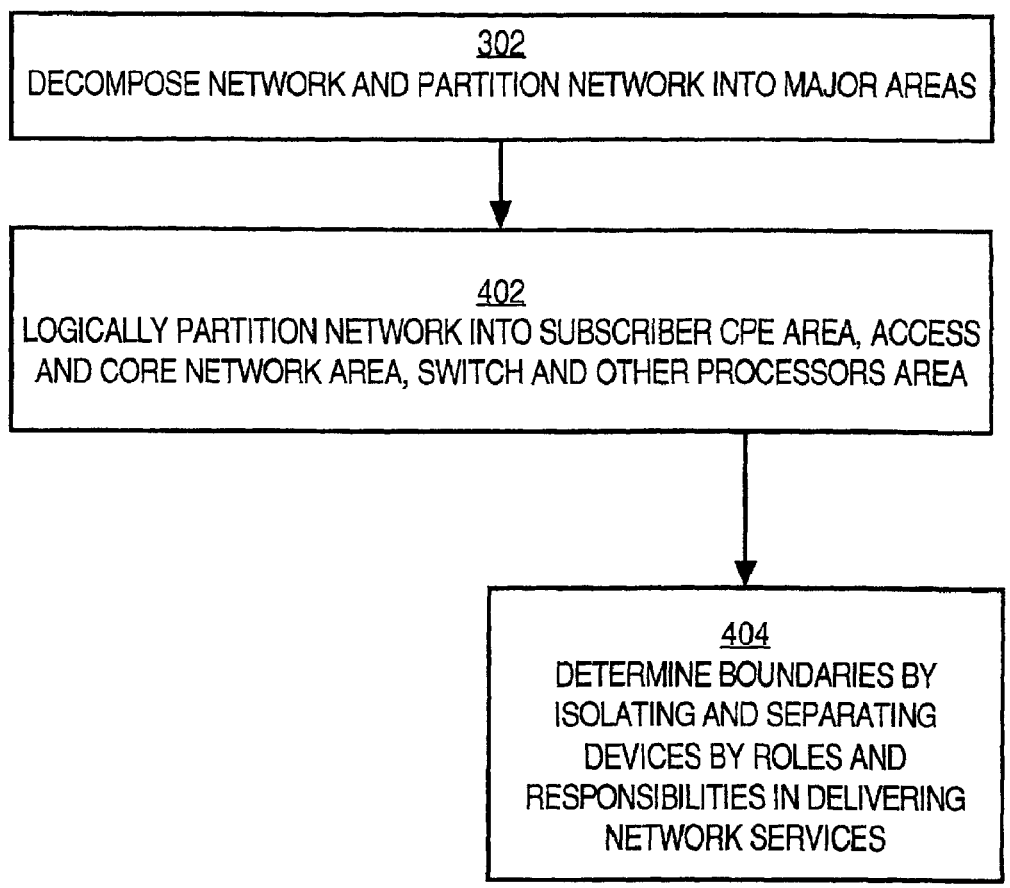
FIG. 4A is a flow diagram of sub-steps involved in certain steps of FIG. 3.

FIG. 4A is a flow diagram of sub-steps that may be used to carry out block 302 of FIG. 3.

Figure 1:
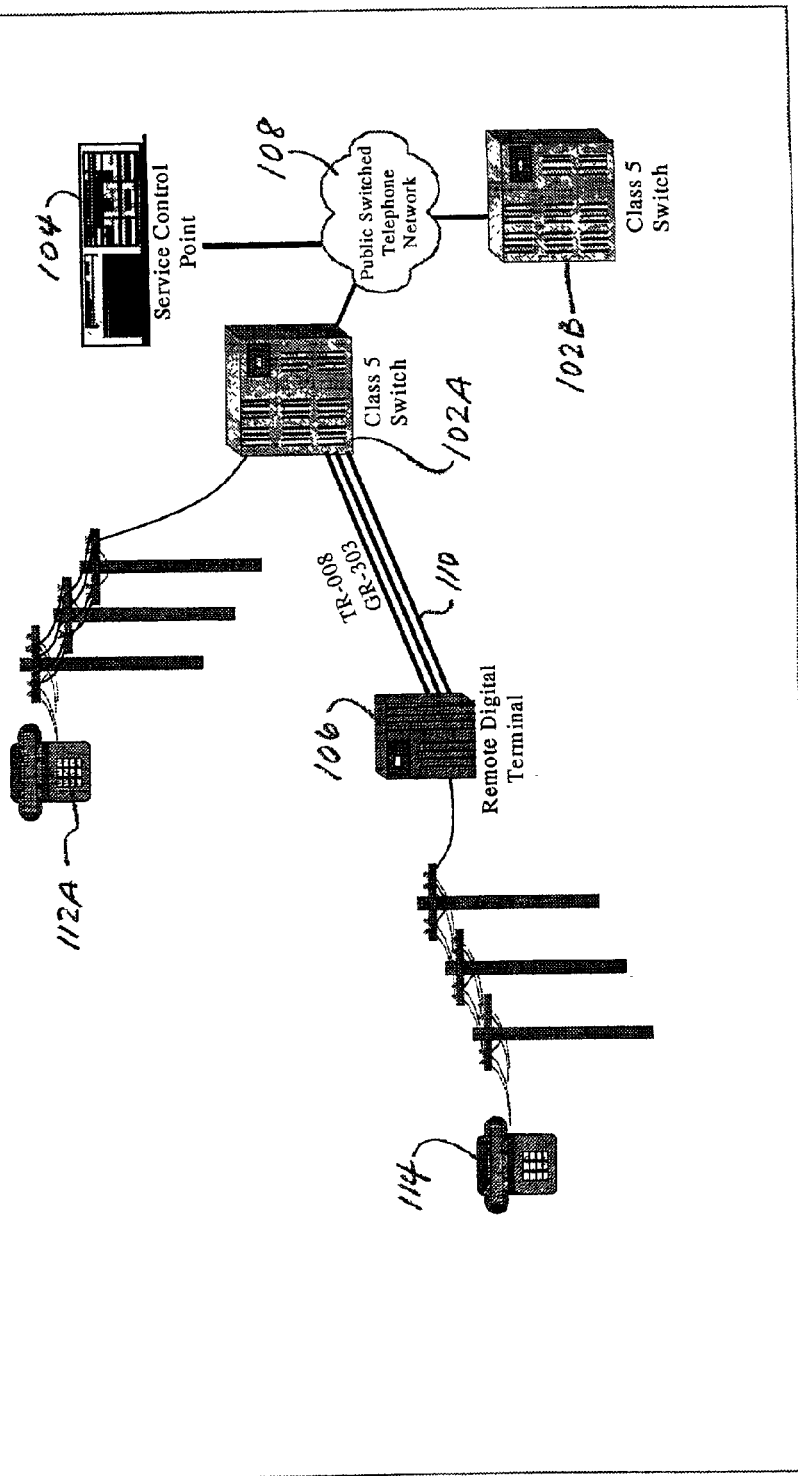
FIG. 1 is a block diagram that illustrates a simplified example of a POTS network.
Figure 2:
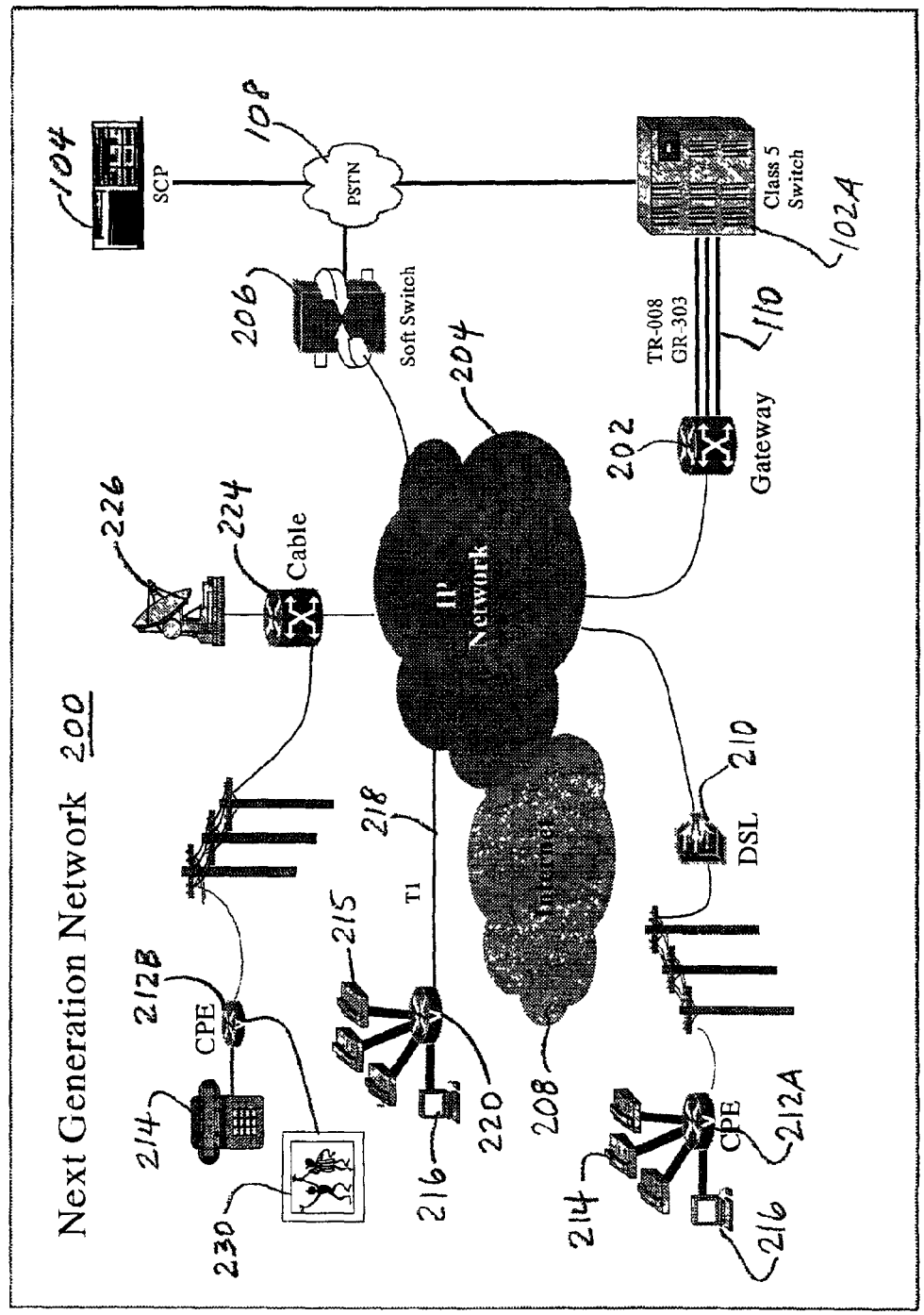
FIG. 2 is a block diagram that illustrates a simplified example of a next generation network.
Figure 4B:
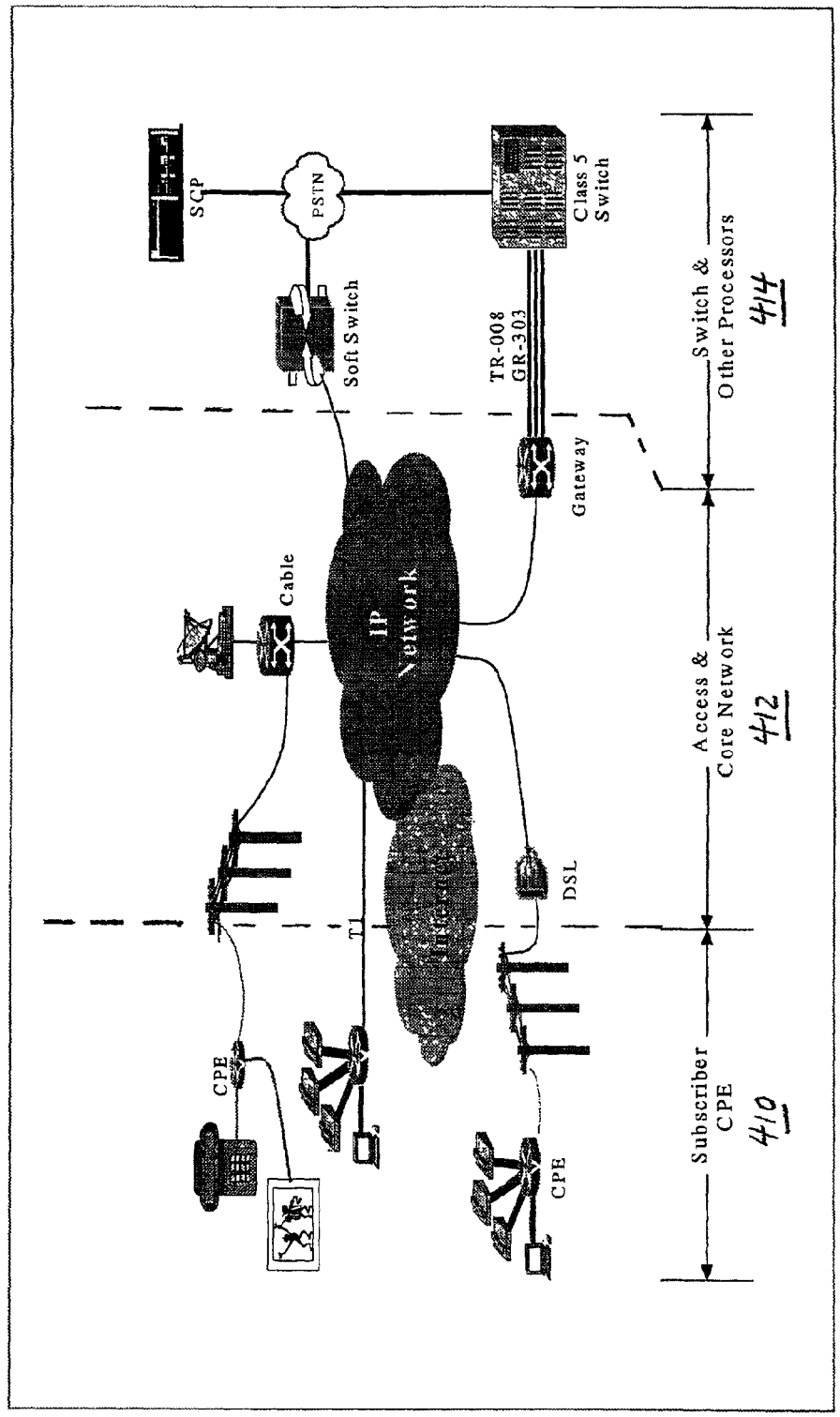
FIG. 4B is a block diagram illustrating how the NGN of FIG. 2 is partitioned into a subscriber CPE area, an access network and core network area, and a switch and other processors area.

In general, an NGN can be logically partitioned into three major areas. In one embodiment, the major areas comprise a subscriber CPE area, an access network and core network area, and a switch and other processors area, as indicated by block 402. FIG. 4B is a block diagram illustrating how the example NGN shown in FIG. 2 could be partitioned into a subscriber CPE area 410, an access network and core network area 412, and a switch and other processors area 414 using the approaches described herein.

As shown in block 404, the boundaries of these partitions are created to isolate and separate devices by their roles and responsibilities in delivering network services. Groupings of similar and/or related functions provided by devices in its own area facilitate the identification of provisioning requirements. Determining boundaries is generally carried out manually based on information about elements in the network and their functions.

Because network topology information or other information that classifies network devices by function is usually not readily available in an NGN, a manual method is preferred, and it is considered important to use a systematic approach to determine provisioning requirements and procedures for an NGN network.

Table 1 describes the functions of the devices in each of the three areas that may be used to make such determinations.

TABLE 1

FUNCTIONS OF DEVICES IN NETWORK AREAS

| Area(s) | Function(s) |
|---|---|
| Subscriber CPE | Network device at customer premise that collaborates with other NGN devices to deliver service(s) |
| Access Network and Core Network | Network devices at access edge and core that provide connectivity between subscriber CPE and other NGN devices |
| Switch and Other Processors | NGN components that provide network services to subscribers |

2.2 Analyze Areas and Identify Provisioning Requirements

Figure 5:
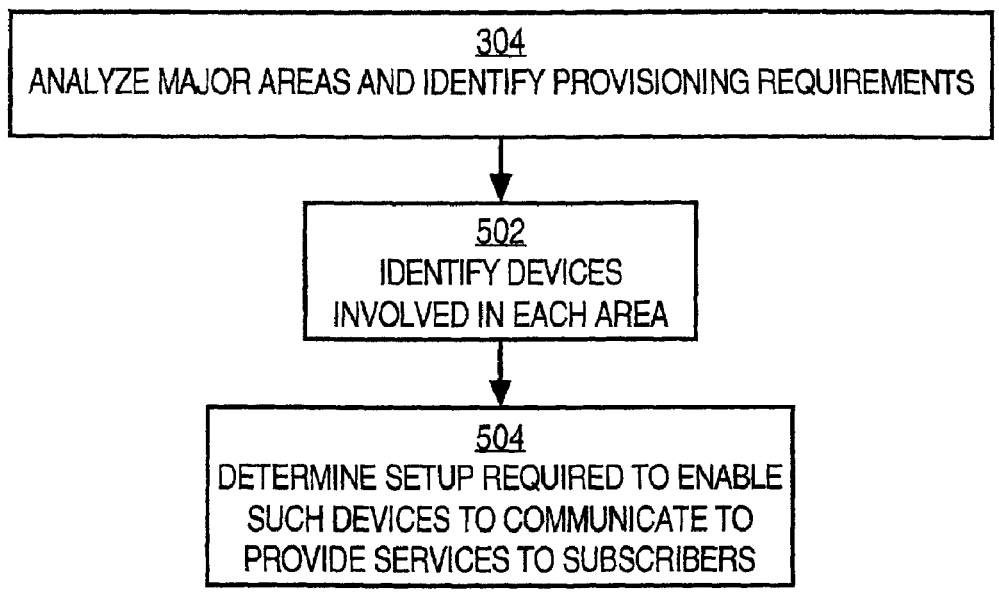
FIG. 5 is a flow diagram of sub-steps involved in certain steps of FIG. 3.
Figure 6:
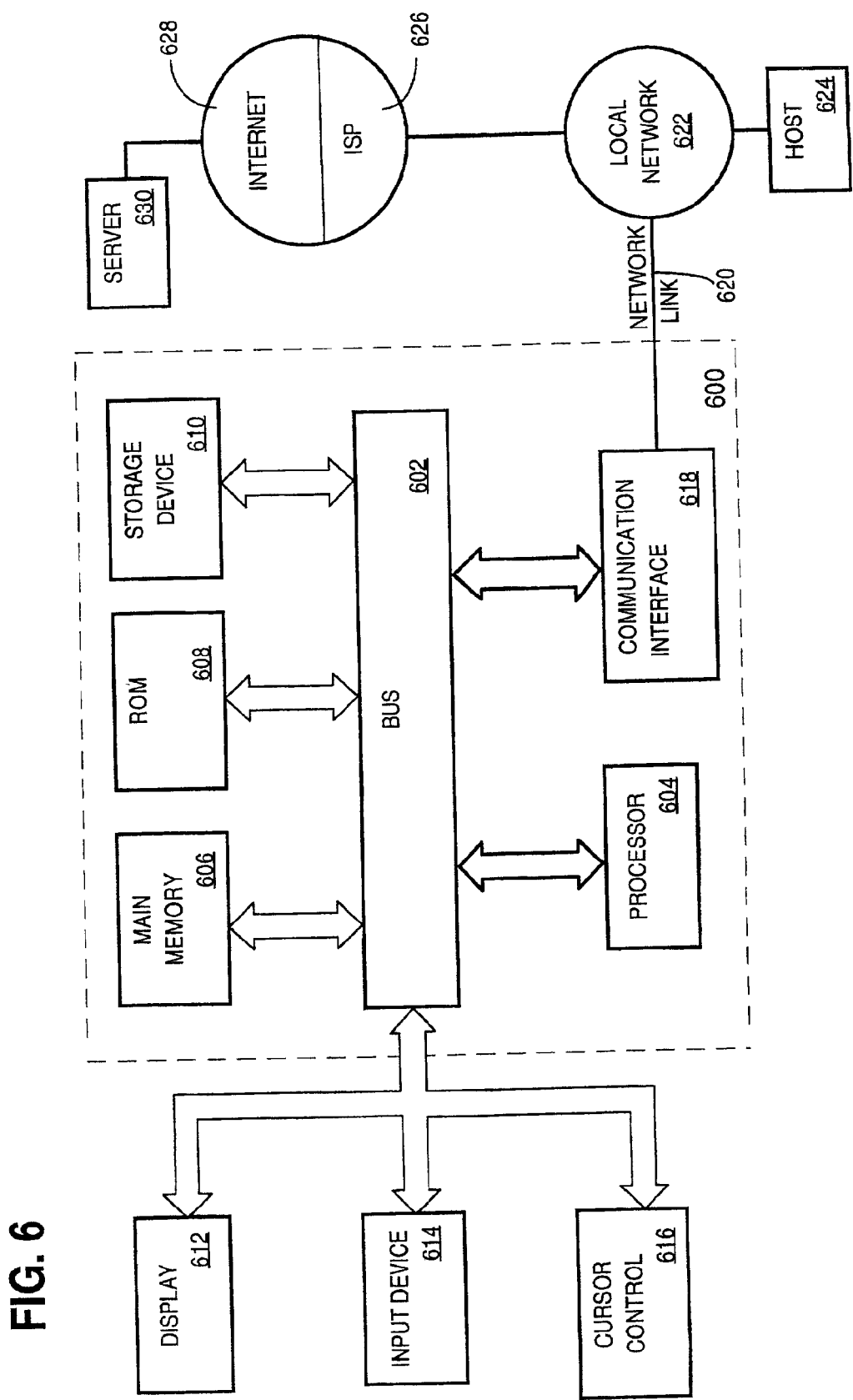
FIG. 6 is a block diagram that illustrates a computer system upon which an embodiment may be implemented.

Block 304 of FIG. 3 involves analyzing the three major areas of the network and identifying provisioning requirements for each area. FIG. 5 is a flow diagram of sub-steps that may be carried out in one implementation of block 304 of FIG. 3.

In general, network design dictates how devices communicate, and their roles and responsibilities in the network to deliver services. Therefore, block 304 may involve analyzing the network and services to identify the devices involved, as shown in block 502 of FIG. 5. Further, a determination is made regarding a setup required to enable such devices to communicate with each other to provide services to subscribers on the network, as shown in block 504. Provisioning requirements for the three areas that define information such as individual device settings resulting from such analysis and determination is stored in a database to facilitate actual provisioning.

The partitioning of network into three functional areas facilitates a grouping of provisioning requirements for each area. At a high logical level, the provisioning requirements for the three areas are:

1. Subscriber CPE—configuration to enable a device to provide one or more subscribed services;
2. Access and Core Network—configuration for the devices at the edge of the access network and core network to provide connection between subscriber CPE and other network devices for subscribed services;

3. Switch and Other Processors—subscription information that includes a unique subscriber identifier, and subscribed services and required parameters.

Analyzing the role of each device in the delivery of service determines the provisioning requirements. This step in the analysis examines each service and steps through the network to identify the settings for each device that participate in the delivery of the service. For example, if a service design uses PVC to carry IP messages between CPE and Call Agent to set up a voice call, provisioning requirements for the three areas are:

a. For Subscriber CPE 220: settings to connect CPE to T1 circuit 218 (connection to network); PVC settings (use PVC to transport data); and IP interface (enable sending and receiving of IP messages from Call Agent).

b. For Access and Core Network 204: PVC settings on port where T1 circuit 218 is terminated (use PVC to transport data); and IP settings on port where T1 circuit 218 is terminated (enable transport of IP messages).

c. For Switch and Other Processors 206: IP settings for subscriber CPE 220 (enable sending and receiving of IP messages from CPE).

In this example, these device settings make up the provisioning requirements for voice service over T1 access. Table 2 summarizes the results of this analysis for delivering voice and data services over DSL. Other services over DSL access, and networks that use other access methods would have different provisioning requirements.

TABLE 2

PROVISIONING REQUIREMENTS FOR LOGICAL NETWORK AREAS

| Area(s) | Provisioning Requirements |
|---|---|
| Subscriber CPE | 1. For Data Service:<br>a. Point-to-Point Protocol (PPP)<br>b. PVC for data traffic<br>2. For Voice Service:<br>a. IP address<br>b. Fully Qualified Domain Name (FQDN)<br>c. PVC for voice traffic and messaging with Soft Switch |
| Access and Core Network | 1. For DSLAM:<br>a. PVC to Internet gateway for data traffic (Data Service)<br>b. PVC to router for voice and messaging traffic (Voice Service)<br>2. For Router: (Voice Service)<br>a. PVC to DSLAM for voice and messaging traffic<br>b. Routing information for voice PVC<br>3. For Internet gateway: (Data Service)<br>a. PVC to DSLAM for data traffic |
| Switch and Other Processors | 1. For Soft Switch: (Voice Service)<br>a. Telephone numbers and mapping to IP address and port<br>b. Subscribed services<br>2. For RADIUS Server: (Data Service)<br>a. User profile |

2.3 Define Procedure and Identify Tools

When provisioning requirements are identified, the next step is to define the procedures to set up the device or group of devices in each of the three areas to activate service for the subscriber, as identified in block 306 of FIG. 3. This step includes understanding the information required to set up a device, and the tools available to perform this task. Steps in the procedure are not limited to configuring devices; such steps may involve obtaining device parameters from other system(s), e.g., IP Address and FQDN.

Using the same example of delivering voice and data service over DSL, the procedures include the steps shown in Table 3.

TABLE 3

PROCEDURAL STEPS AND TOOLS FOR PROVISIONING

| Area(s) | Steps | Tools & Other Systems |
|---|---|---|
| Subscriber CPE | Collect CPE parameters -<br>IP Address<br>FQDN<br>Voice PVC<br>Data PVC<br>Username and password<br>(Radius server entry)<br>Create configuration file<br>Load configuration file | DHCP server<br>DNS server |
| Access & Core Network | Provision DSLAM -<br>Data PVC to connect CPE to Internet gateway<br>Voice PVC to connect CPE to router | Element Management System (EMS) |
|  | Provision router -<br>Voice PVC to DSLAM<br>Routing information for voice PVC | EMS |
|  | Provision Internet gateway -<br>Data PVC to DSLAM | EMS |
| Switch & Other Processors | Provision Soft Switch -<br>Subscriber information | EMS |
|  | Provision Radius Server -<br>Define user profile | EMS |

Each tool such as an EMS may provide different interfaces to perform a task. For example, an EMS may provide a GUI interface for a user to set up a device, or it may provide an electronic interface for another tool to deliver the required configuration parameters to the device th rough the EMS.

2.4 Define Sequence of Execution

Block 308 of FIG. 3 involves analyzing and resolving one or more inter-dependencies of the procedures for the three areas. Output of this analysis is a final order of execution of steps within the different procedures.

The sequence of steps for provisioning a DSL subscriber for voice and data service is summarized in Table 4.

TABLE 4

EXAMPLE SEQUENCE OF PROVISIONING STEPS

| Areas | Steps | Sequence | Comments |
|---|---|---|---|
| Subscriber CPE | Collect CPE parameters -<br>IP Address<br>FQDN<br>Voice PVC<br>Username and password<br>Data PVC | 2 | Match DSLAM provisioning<br>Match Radius server entry<br>Match DSLAM provisioning |
|  | Create configuration file | 3a | |
|  | Load configuration file | 4 | |
| Access & Core Network | Provision DSLAM -<br>Data PVC to connect CPE to gateway<br>Voice PVC to connect CPE to router | 1a | |
|  | Provision router -<br>Voice PVC to DSLAM<br>Routing information for voice PVC | 3b | Match IP address assigned to CPE |
|  | Provision Internet gateway -<br>Data PVC to DSLAM | 1b | |

TABLE 4-continued

EXAMPLE SEQUENCE OF PROVISIONING STEPS

| Areas | Steps | Sequence | Comments |
|---|---|---|---|
| Switch & Other Processors | Provision Soft Switch - Subscriber information | 3c | Match FQDN assigned to CPE |
| | Provision Radius Server - Define user profile | 1c | |

The sequence of execution is determined manually by understanding the dependencies of identified provisioning requirements. For example, subscriber IP information cannot be entered into the Soft Switch until it has been set up for CPE.

Steps that are labeled with letters indicate that there are no dependencies with respect to other steps that have the name number and different letters. Thus, such steps may be executed in parallel, or in any order. For example, steps 1a, 1b, and 1c may be executed in the order 1a–1c–1b, or in the order 1b–1a–1c.

Depending on the function of each step, and tools used to perform function, a step may consist of multiple steps. For example, entering and reviewing data in multiple EMS screens is required to provision PVC on the DSLAM. A procedure detailing all these steps defines the procedure to provision NGN subscribers.

An ordered sequence of execution steps with an identification of any associated required tools, of the type shown in Table 4, may be created and stored in any medium that is convenient, thereby resulting in creating and storing a provisioning plan for provisioning subscribers in the network. Using the foregoing process, diverse NGN configurations can be systematically analyzed to identify provisioning requirements for definition of procedures to provision subscribers. Execution of provisioning procedure maybe performed manually, or automated depending on the capability of the tools and availability of Network Management System (NMS). NMS are computer applications that provide the function of automating operational procedures such as provisioning. Using such systems and applications, one or more commands, data, or other information are sent to all necessary devices in the NGN to result in provisioning services for a subscriber.

3.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method to systematically analyze a next generation telecommunications network to result in creating a provisioning plan and procedures for provisioning the network to provide services for one or more subscribers, the method comprising the steps of:

creating and storing information that represents a logical decomposition of the next generation network into a plurality of discrete functional areas;

analyzing the information representing the functional areas to identify one or more provisioning requirements for each of the functional areas;

defining one or more provisioning procedures and identifying one or more required provisioning tools for each of the functional areas, based on the provisioning requirements; and creating and storing a sequence of execution of the procedures and tools as the provisioning plan.

2. A method as recited in claim 1, wherein the steps of creating and storing information that represents a logical decomposition of the next generation network into a plurality of discrete functional areas further comprise the steps of logically partitioning the next generation network into a subscriber customer premises equipment area, an access network and core network area, and a switch and other processors area.

3. A method as recited in claim 2, wherein the step of logically partitioning the next generation network comprises the steps of determining one or more boundaries of the discrete functional areas based on classifying devices according to functions performed by the devices in delivering network services.

4. A method as recited in claim 1, wherein the step of analyzing the information representing the functional areas comprises the steps of identifying one or more network devices that are involved in each of the functional areas, and for each of the identified devices, determining a setup that is required to enable the identified devices to inter-communicate to provide the services to the subscribers.

5. A method to systematically analyze a next generation telecommunications network to result in creating a provisioning plan and procedures for provisioning the network to provide services for one or more subscribers, the method comprising the steps of:

creating and storing information that represents a logical decomposition of the next generation network into a plurality of discrete functional areas, by logically partitioning the next generation network into a subscriber customer premises equipment area, an access network and core network area, and a switch and other processors area;

analyzing the information representing the functional areas to identify one or more provisioning requirements for each of the functional areas, by identifying one or more network devices that are involved in each of the functional areas, and for each of the identified devices, determining a setup that is required to enable the identified devices to inter-communicate to provide the services to the subscribers;

defining one or more provisioning procedures and identifying one or more required provisioning tools for each of the functional areas, based on the provisioning requirements; and creating and storing a sequence of execution of the procedures and tools as the provisioning plan.

6. A method as recited in claim 5, wherein the step of logically partitioning the next generation network comprises the steps of determining one or more boundaries of the discrete functional areas based on classifying devices according to functions performed by the devices in delivering network service.

7. A method, comprising the steps of:

before provisioning a next-generation telecommunications network, performing a systematic analysis of the next-generation telecommunications network by the steps of:

creating and storing information that represents a logical decomposition of the next generation network into a plurality of discrete functional areas;

analyzing the information representing the functional areas to identify one or more provisioning requirements for each of the functional areas;

defining one or more provisioning procedures and identifying one or more required provisioning tools for each of the functional areas, based on the provisioning requirements;

creating and storing a sequence of execution of the procedures and tools as the provisioning plan;

provisioning the next-generation telecommunications network by executing the procedures and tools identified in the provisioning plan in the sequence identified therein.

8. A method as recited in claim 7, wherein the steps of creating and storing information that represents a logical decomposition of the next generation network into a plurality of discrete functional areas further comprise the steps of logically partitioning the next generation network into a subscriber customer premises equipment area, an access network and core network area, and a switch and other processors area.

9. A method as recited in claim 8, wherein the step of logically partitioning the next generation network comprises the steps of determining one or more boundaries of the discrete functional areas based on classifying devices according to functions performed by the devices in delivering network services.

10. A method as recited in claim 8, wherein the step of logically partitioning the next generation network comprises the steps of determining one or more boundaries of the discrete functional areas based on classifying devices according to roles and responsibilities performed by the devices in delivering network services.

11. A method as recited in claim 7, wherein the step of analyzing the information representing the functional areas comprises the steps of identifying one or more network devices that are involved in each of the functional areas, and for each of the identified devices, determining a setup that is required to enable the identified devices to inter-communicate to provide the services to the subscribers.

12. A method as recited in claim 11, further comprising the steps of defining one or more individual device settings for the setup and storing the individual device settings in a database for use later in actual provisioning.

13. A method as recited in claim 12, wherein the step of defining one or more provisioning procedures and identifying one or more required provisioning tools for each of the functional areas, based on the provisioning requirements, comprises:

identifying one or more of an Element Management System, Dynamic Host Configuration Protocol server, and Domain Name System server as the required provisioning tools;

storing in a database table associations of information identifying the functional areas, individual device settings for the setup, and required provisioning tools.

14. A method as recited in claim 7, wherein the step of defining one or more provisioning procedures and identifying one or more required provisioning tools for each of the functional areas, based on the provisioning requirements, includes identifying one or more of an Element Management System, Dynamic Host Configuration Protocol server, and Domain Name System server.

15. A method as recited in claim 7, wherein the step of creating and storing a sequence of execution of the procedures and tools as the provisioning plan includes analyzing and resolving one or more inter-dependencies of procedures applicable to subscriber CPE devices, access and core network devices, and switches or other processors.

16. A computer-readable medium carrying instructions which, when executed by one or more processors, cause:

creating and storing information that represents a logical decomposition of the next generation network into a plurality of discrete functional areas;

analyzing the information representing the functional areas to identify one or more provisioning requirements for each of the functional areas;

defining one or more provisioning procedures and identifying one or more required provisioning tools for each of the functional areas, based on the provisioning requirements; and creating and storing a sequence of execution of the procedures and tools as the provisioning plan.

17. A computer-readable medium as recited in claim 16, wherein creating and storing information that represents a logical decomposition of the next generation network into a plurality of discrete functional areas includes logically partitioning the next generation network into a subscriber customer premises equipment area, an access network and core network area, and a switch and other processors area.

18. A computer-readable medium as recited in claim 17, wherein logically partitioning the next generation network includes determining one or more boundaries of the discrete functional areas based on classifying devices according to functions performed by the devices in delivering network services.

19. A computer-readable medium as recited in claim 16, wherein analyzing the information representing the functional areas includes identifying one or more network devices that are involved in each of the functional areas, and for each of the identified devices, determining a setup that is required to enable the identified devices to inter-communicate to provide the services to the subscribers.

20. A computer-readable for systematically analyzing a next generation telecommunications network to result in creating a provisioning plan and procedures for provisioning the network to provide services for one or more subscribers, the computer-readable medium carrying instructions which, when executed by one or more processors cause:

creating and storing information that represents a logical decomposition of the next generation network into a plurality of discrete functional areas, by logically partitioning the next generation network into a subscriber customer premises equipment area, an access network and core network area, and a switch and other processors area;

analyzing the information representing the functional areas to identify one or more provisioning requirements for each of the functional areas, by identifying one or more network devices that are involved in each of the functional areas, and for each of the identified devices, determining a setup that is required to enable the identified devices to inter-communicate to provide the services to the subscribers;

defining one or more provisioning procedures and identifying one or more required provisioning tools for each of the functional areas, based on the provisioning requirements; and creating and storing a sequence of execution of the procedures and tools as the provisioning plan.

21. A computer-readable medium as recited in claim 20, wherein logically partitioning the next generation network includes determining one or more boundaries of the discrete functional areas based on classifying devices according to functions performed by the devices in delivering network service.

22. A computer-readable medium carrying instructions which, when executed by one or more processors, cause:

before provisioning a next-generation telecommunications network, performing a systematic analysis of the next-generation telecommunications network by:

creating and storing information that represents a logical decomposition of the next generation network into a plurality of discrete functional areas;

analyzing the information representing the functional areas to identify one or more provisioning requirements for each of the functional areas;

defining one or more provisioning procedures and identifying one or more required provisioning tools for each of the functional areas, based on the provisioning requirements;

creating and storing a sequence of execution of the procedures and tools as the provisioning plan; and provisioning the next-generation telecommunications network by executing the procedures and tools identified in the provisioning plan in the sequence identified therein.

23. A computer-readable medium as recited in claim 22, wherein creating and storing information that represents a logical decomposition of the next generation network into a plurality of discrete functional areas includes logically partitioning the next generation network into a subscriber customer premises equipment area, an access network and core network area, and a switch and other processors area.

24. A computer-readable medium as recited in claim 23, wherein logically partitioning the next generation network includes determining one or more boundaries of the discrete functional areas based on classifying devices according to functions performed by the devices in delivering network services.

25. A computer-readable medium as recited in claim 23, wherein logically partitioning the next generation network includes determining one or more boundaries of the discrete functional areas based on classifying devices according to roles and responsibilities performed by the devices in delivering network services.

26. A computer-readable medium as recited in claim 22, wherein analyzing the information representing the functional areas includes identifying one or more network devices that are involved in each of the functional areas, and for each of the identified devices, determining a setup that is required to enable the identified devices to inter-communicate to provide the services to the subscribers.

27. A computer-readable medium as recited in claim 26, further comprising additional instructions which, when executed by the one or more processors, cause defining one or more individual device settings for the setup and storing the individual device settings in a database for use later in actual provisioning.

28. A computer-readable medium as recited in claim 27, wherein defining one or more provisioning procedures and identifying one or more required provisioning tools for each of the functional areas, based on the provisioning requirements, includes:

identifying one or more of an Element Management System, Dynamic Host Configuration Protocol server, and Domain Name System server as the required provisioning tools;

storing in a database table associations of information identifying the functional areas, individual device settings for the setup, and required provisioning tools.

29. A computer-readable medium as recited in claim 22, wherein defining one or more provisioning procedures and identifying one or more required provisioning tools for each of the functional areas, based on the provisioning requirements, includes identifying one or more of an Element Management System, Dynamic Host Configuration Protocol server, and Domain Name System server.

30. A computer-readable medium as recited in claim 22, wherein creating and storing a sequence of execution of the procedures and tools as the provisioning plan includes analyzing and resolving one or more inter-dependencies of procedures applicable to subscriber CPE devices, access and core network devices, and switches or other processors.

31. An apparatus comprising a memory carrying instructions which, when executed by one or more processors, cause:

creating and storing information that represents a logical decomposition of the next generation network into a plurality of discrete functional areas;

analyzing the information representing the functional areas to identify one or more provisioning requirements for each of the functional areas;

defining one or more provisioning procedures and identifying one or more required provisioning tools for each of the functional areas, based on the provisioning requirements; and creating and storing a sequence of execution of the procedures and tools as the provisioning plan.

32. An apparatus as recited in claim 31, wherein creating and storing information that represents a logical decomposition of the next generation network into a plurality of discrete functional areas includes logically partitioning the next generation network into a subscriber customer premises equipment area, an access network and core network area, and a switch and other processors area.

33. An apparatus as recited in claim 32, wherein logically partitioning the next generation network includes determining one or more boundaries of the discrete functional areas based on classifying devices according to functions performed by the devices in delivering network services.

34. An apparatus as recited in claim 31, wherein analyzing the information representing the functional areas includes identifying one or more network devices that are involved in each of the functional areas, and for each of the identified devices, determining a setup that is required to enable the identified devices to inter-communicate to provide the services to the subscribers.

35. An apparatus for systematically analyzing a next generation telecommunications network to result in creating a provisioning plan and procedures for provisioning the network to provide services for one or more subscribers, the apparatus comprising a memory carrying instructions which, when executed by one or more processors cause:

creating and storing information that represents a logical decomposition of the next generation network into a plurality of discrete functional areas, by logically partitioning the next generation network into a subscriber customer premises equipment area, an access network and core network area, and a switch and other processors area;

analyzing the information representing the functional areas to identify one or more provisioning requirements for each of the functional areas, by identifying one or more network devices that are involved in each of the functional areas, and for each of the identified devices, determining a setup that is required to enable the identified devices to inter-communicate to provide the services to the subscribers;

defining one or more provisioning procedures and identifying one or more required provisioning tools for each of the functional areas, based on the provisioning requirements; and creating and storing a sequence of execution of the procedures and tools as the provisioning plan.

36. An apparatus as recited in claim 35, wherein logically partitioning the next generation network includes determining one or more boundaries of the discrete functional areas based on classifying devices according to functions performed by the devices in delivering network service.

37. An apparatus comprising a memory carrying instructions which, when executed by one or more processors, cause performing a systematic analysis of a next-generation telecommunications network before provisioning the next-generation telecommunications network by:

creating and storing information that represents a logical decomposition of the next generation network into a plurality of discrete functional areas;

analyzing the information representing the functional areas to identify one or more provisioning requirements for each of the functional areas;

defining one or more provisioning procedures and identifying one or more required provisioning tools for each of the functional areas, based on the provisioning requirements;

creating and storing a sequence of execution of the procedures and tools as the provisioning plan;

provisioning the next-generation telecommunications network by executing the procedures and tools identified in the provisioning plan in the sequence identified therein.

38. An apparatus as recited in claim 37, wherein creating and storing information that represents a logical decomposition of the next generation network into a plurality of discrete functional areas includes logically partitioning the next generation network into a subscriber customer premises equipment area, an access network and core network area, and a switch and other processors area.

39. An apparatus as recited in claim 38, wherein logically partitioning the next generation network includes determining one or more boundaries of the discrete functional areas based on classifying devices according to functions performed by the devices in delivering network services.

40. An apparatus as recited in claim 38, wherein logically partitioning the next generation network includes determining one or more boundaries of the discrete functional areas based on classifying devices according to roles and responsibilities performed by the devices in delivering network services.

41. An apparatus as recited in claim 37, wherein analyzing the information representing the functional areas includes identifying one or more network devices that are involved in each of the functional areas, and for each of the identified devices, determining a setup that is required to enable the identified devices to inter-communicate to provide the services to the subscribers.

42. An apparatus as recited in claim 41, wherein the memory further comprises additional instructions which, when executed by the one or more processors, cause defining one or more individual device settings for the setup and storing the individual device settings in a database for use later in actual provisioning.

43. An apparatus as recited in claim 42, wherein defining one or more provisioning procedures and identifying one or more required provisioning tools for each of the functional areas, based on the provisioning requirements, includes:

identifying one or more of an Element Management System, Dynamic Host Configuration Protocol server, and Domain Name System server as the required provisioning tools;

storing in a database table associations of information identifying the functional areas, individual device settings for the setup, and required provisioning tools.

44. An apparatus as recited in claim 37, wherein defining one or more provisioning procedures and identifying one or more required provisioning tools for each of the functional areas, based on the provisioning requirements, includes identifying one or more of an Element Management System, Dynamic Host Configuration Protocol server, and Domain Name System server.

45. An apparatus as recited in claim 37, wherein creating and storing a sequence of execution of the procedures and tools as the provisioning plan includes analyzing and resolving one or more inter-dependencies of procedures applicable to subscriber CPE devices, access and core network devices, and switches or other processors.

46. An apparatus comprising:

means for creating and storing information that represents a logical decomposition of the next generation network into a plurality of discrete functional areas;

means for analyzing the information representing the functional areas to identify one or more provisioning requirements for each of the functional areas;

means for defining one or more provisioning procedures and identifying one or more required provisioning tools for each of the functional areas, based on the provisioning requirements; and means for creating and storing a sequence of execution of the procedures and tools as the provisioning plan.

47. An apparatus as recited in claim 46, wherein the means for creating and storing information that represents a logical decomposition of the next generation network into a plurality of discrete functional areas includes means for logically partitioning the next generation network into a subscriber customer premises equipment area, an access network and core network area, and a switch and other processors area.

48. An apparatus as recited in claim 47, wherein the means for logically partitioning the next generation network includes means for determining one or more boundaries of the discrete functional areas based on classifying devices according to functions performed by the devices in delivering network services.

49. An apparatus as recited in claim 46, wherein the means for analyzing the information representing the functional areas includes means for identifying one or more network devices that are involved in each of the functional areas, and for each of the identified devices, determining a setup that is required to enable the identified devices to inter-communicate to provide the services to the subscribers.

50. An apparatus for systematically analyzing a next generation telecommunications network to result in creating a provisioning plan and procedures for provisioning the network to provide services for one or more subscribers, the apparatus comprising:

means for creating and storing information that represents a logical decomposition of the next generation network into a plurality of discrete functional areas, by logically partitioning the next generation network into a subscriber customer premises equipment area, an access network and core network area, and a switch and other processors area;

means for analyzing the information representing the functional areas to identify one or more provisioning requirements for each of the functional areas, by identifying one or more network devices that are involved in each of the functional areas, and for each of the identified devices, determining a setup that is required to enable the identified devices to inter-communicate to provide the services to the subscribers;

means for defining one or more provisioning procedures and identifying one or more required provisioning tools for each of the functional areas, based on the provisioning requirements; and means for creating and storing a sequence of execution of the procedures and tools as the provisioning plan.

51. An apparatus as recited in claim 50, wherein the means for logically partitioning the next generation network includes means for determining one or more boundaries of the discrete functional areas based on classifying devices according to functions performed by the devices in delivering network service.

52. An apparatus for performing a systematic analysis of a next-generation telecommunications network before provisioning the next-generation telecommunications network, the apparatus comprising:

means for creating and storing information that represents a logical decomposition of the next generation network into a plurality of discrete functional areas;

means for analyzing the information representing the functional areas to identify one or more provisioning requirements for each of the functional areas;

means for defining one or more provisioning procedures and identifying one or more required provisioning tools for each of the functional areas, based on the provisioning requirements;

means for creating and storing a sequence of execution of the procedures and tools as the provisioning plan; and means for provisioning the next-generation telecommunications network by executing the procedures and tools identified in the provisioning plan in the sequence identified therein.

53. An apparatus as recited in claim 52, wherein the means for creating and storing information that represents a logical decomposition of the next generation network into a plurality of discrete functional areas includes means for logically partitioning the next generation network into a subscriber customer premises equipment area, an access network and core network area, and a switch and other processors area.

54. An apparatus as recited in claim 53, wherein the means for logically partitioning the next generation network includes means for determining one or more boundaries of the discrete functional areas based on classifying devices according to functions performed by the devices in delivering network services.

55. An apparatus as recited in claim 53, wherein the means for logically partitioning the next generation network includes means for determining one or more boundaries of the discrete functional areas based on classifying devices according to roles and responsibilities performed by the devices in delivering network services.

56. An apparatus as recited in claim 52, wherein the means for analyzing the information representing the functional areas includes means for identifying one or more network devices that are involved in each of the functional areas, and for each of the identified devices, determining a setup that is required to enable the identified devices to inter-communicate to provide the services to the subscribers.

57. An apparatus as recited in claim 56, wherein the apparatus further comprises means for defining one or more individual device settings for the setup and storing the individual device settings in a database for use later in actual provisioning.

58. An apparatus as recited in claim 57, wherein the means for defining one or more provisioning procedures and identifying one or more required provisioning tools for each of the functional areas, based on the provisioning requirements, includes:

means for identifying one or more of an Element Management System, Dynamic Host Configuration Protocol server, and Domain Name System server as the required provisioning tools; and means for storing in a database table associations of information identifying the functional areas, individual device settings for the setup, and required provisioning tools.

59. An apparatus as recited in claim 52, wherein the means for defining one or more provisioning procedures and identifying one or more required provisioning tools for each of the functional areas, based on the provisioning requirements, includes means for identifying one or more of an Element Management System, Dynamic Host Configuration Protocol server, and Domain Name System server.

60. An apparatus as recited in claim 52, wherein the means for creating and storing a sequence of execution of the procedures and tools as the provisioning plan includes means for analyzing and resolving one or more inter-dependencies of procedures applicable to subscriber CPE devices, access and core network devices, and switches or other processors.

* * * * *